United States Patent [19]
Tani et al.

[11] Patent Number: 6,004,525
[45] Date of Patent: Dec. 21, 1999

[54] HOLLOW OXIDE PARTICLE AND PROCESS FOR PRODUCING THE SAME

[75] Inventors: Takao Tani; Kazumasa Takatori; Nobuo Kamiya, all of Aichi, Japan

[73] Assignee: Kabushiki Kaisha Toyota Chuo Kenkyusho, Aichi-gun, Japan

[21] Appl. No.: 09/166,122

[22] Filed: Oct. 5, 1998

[30] Foreign Application Priority Data

Oct. 6, 1997 [JP] Japan .................................. 9-272809
Jun. 19, 1998 [JP] Japan ................................ 10-172795

[51] Int. Cl.⁶ ...................................................... C01F 7/00
[52] U.S. Cl. ........................... 423/600; 423/625; 423/628
[58] Field of Search ..................................... 423/625, 600, 423/628; 502/8, 9

[56] References Cited

U.S. PATENT DOCUMENTS

| | | |
|---|---|---|
| 2,900,244 | 8/1959 | Bradstreet et al. . |
| 3,347,798 | 10/1967 | Baer et al. .................................. 502/8 |
| 4,392,987 | 7/1983 | Laine et al. .............................. 423/625 |
| 4,532,121 | 7/1985 | Bachelard et al. ....................... 423/625 |
| 5,318,797 | 6/1994 | Matijevic et al. ........................ 427/222 |
| 5,762,894 | 6/1998 | Takatori et al. . |
| 5,811,068 | 9/1998 | Takatori et al. . |

FOREIGN PATENT DOCUMENTS

| | | |
|---|---|---|
| 43 07 333 | 8/1994 | Germany . |
| 60-122779 | 7/1985 | Japan . |
| 63-258642 | 10/1988 | Japan . |
| 1-16773 | 3/1989 | Japan . |
| 1-32169 | 6/1989 | Japan . |
| 3-47528 | 2/1991 | Japan . |
| 4-250842 | 9/1992 | Japan . |
| 4-265150 | 9/1992 | Japan . |
| 6-7670 | 1/1994 | Japan . |
| 6-285358 | 10/1994 | Japan . |
| 7-81905 | 3/1995 | Japan . |
| 7-96165 | 4/1995 | Japan . |
| 8-91821 | 4/1996 | Japan . |
| 9-294929 | 11/1997 | Japan . |

OTHER PUBLICATIONS

Yüksel Sarikaya, et al., "Preparation of Alumina Microshells by the Emulsion Evaporation Technique," Ceramics International, vol. 14, (1988), pp. 239–244.

*Primary Examiner*—Steven Bos
*Attorney, Agent, or Firm*—Oblon, Spivak, McClelland, Maier & Neustadt, P.C.

[57] ABSTRACT

The present invention provides a hollow oxide particle including a shell wall constituting a hollow room, and the shell wall has a thickness of 20 nm or less. The shell wall may be mainly composed from at least one selected from the group consisting of alumina, spinel, iron oxides, yttrium oxides, and titanium oxides. A process for producing the hollow oxide particle comprises the steps of: forming a Water in Oil (W/O) type emulsion including aqueous microspheres having a each diameter of 100 nm or more, by adding an organic solvent to an aqueous solution dissolving and/or suspending at least one of metal salts and metal compounds; and forming the hollow oxide particle by atomizing the Water in Oil (W/O) type emulsion to burn. When the hollow oxide particle is brought into contact with a water-containing solution, a surface of the shell wall may have a minutely irregular surface.

10 Claims, 3 Drawing Sheets

HOLLOW OXIDE PARTICLE AND PROCESS FOR PRODUCING THE SAME

BACKGROUND OF THE INVENTION

1. Field of the Invention

The present invention relates to a hollow oxide particle and a process for producing the same. The hollow oxide particle is, for example, applicable to catalytic carriers.

2. Description of the Related Art

There has been provided a hollow oxide particle whose specific surface area is generally 5–10 times or more times larger than that of a solid powder particle, a non-hollow particle. The hollow oxide particle is larger in diameter than the non-hollow powder particle, when the specific surface areas of both particles are same. Such particle having larger diameter is treated easily. So, the hollow oxide particle is applicable to catalytic carriers because of their large specific surface area and large diameter. It is also expectable as concealing agents and micro-capsules.

Japanese Unexamined Patent Publication (KOKAI) 6-7,670 discloses a process for producing a porous particle or a hollow particles formed. In this publication technique, firstly, spherical polymer particles for forming cores are uniformly dispersed in a solution including a metal salt having a hydrolysis property, so that polymer-metal compound particles are formed in which each spherical polymer core is covered with a metal compound layer. The polymer-metal compound particle is in the range of 0.07–30 μm in diameter, and its ratio of inner-diameter to outer-diameter is in the range 0.40–0.95. In this publication technique, secondly, the polymer-metal compound particles are heated for decomposing the core-polymer into carbon or carbon dioxide, so that they are transformed into another spherical particles in which each spherical carbon is covered with a metal compound layer or a hollow particle. This publication technique exhibits complicated steps to increase costs. Also, this publication technique, using a precipitating method, can hardly produce a homogeneous complex oxide particle because the precipitation rates of the metal salts are usually different from each other.

Japanese Unexamined Patent Publication (KOKAI) 63-258,642 discloses a process for producing a hollow particle. In this publication process, after an Oil in Water (O/W) type emulsion is composed by mixing an organic solvent with an aqueous solution including inorganic compounds, the Oil in Water (O/W) type emulsion is added into an organic solvent including a hydropholic surfactant to compose an Oil in Water in Oil (O/W/O) type emulsion. Next, the O/W/O type emulsion is mixed with a solution including compounds capable of precipitating a water-insoluble precursor in order to form a hollow particle. This publication process requires a calcination step of the precipitated precursor to cause complicated steps, the process exhibits a problem in homogeneity of the particle, and it can not produce a hollow particle having a shell wall thickness of 20 nm or less.

Japanese Unexamined Patent Publication (KOKAI) 3-47,528 discloses a process for producing spherical a hollow particle of metal oxide. In this publication process, firstly, an emulsion is composed by a mix of a first oil and a second oil into a metal compound solution. Secondly, the spherical hollow particle is made by removing of the oils and water from the emulsion. This publication process causes complicated steps, it can hardly produce a homogeneous complex oxide particle because the solubilities of metal compounds are different from each other, and it can not produce the particle whose shell wall has a thickness of 20 nm or less.

Japanese Unexamined Patent Publication (KOKAI) 60-122,779 discloses a technique for producing porous particles. This technique uses $MgAl_2O_4$ obtained by a spray pyrolisis as a raw material. The raw material is formed and sintered to produce the porous body in which the pore size and distribution are easily controlled. In this technique, each of atomized droplets, the diameter of which is in the range of tens μm in size under efficient conditions, constitutes a reaction site. Namely, size of the reaction site of this technique is ten times or much larger than that of an emulsion-combustion method. This technique, therefore, may cause heterogeneous particles, and it has difficulty in producing the hollow particle having a shell wall thickness of 20 nm or less, judging from the aforementioned presupposition that each of the atomized droplets constitutes each of porous particles.

Japanese Unexamined Patent Publication (KOKAI) 8-91,821 discloses a technique for producing a hollow silica particle by use of a sol-gel method of alkoxide. This technique uses alkoxide raw material exhibiting expensive costs. With this publication disclosing nothing about a shell wall thickness, judging from the fact that the hollow silica particle is as large as 2–8 μm in diameter, it is hardly thought that the hollow silica particles has a shell wall thickness of 20 nm or less.

Further, "Ceram. Inter." (vol.,14 (1988), 239–244) discloses a technique for producing a hollow alumina particle by use of an emulsion-evaporating technique. This reference technique requires a calcination step after producing a precursor. According to a Scanning Electron Microscopy (SEM) photograph in this reference, a shell wall of the particle is hundreds nm or more in thickness.

SUMMARY OF THE INVENTION

The present invention has been developed in a view of the aforementioned circumstances. It is therefore an object of the present invention to provide a hollow oxide particle whose shell wall is thin in thickness. It is a further object of the present invention to provide a process for simply producing a hollow oxide particle whose shell wall is thin in thickness. It is a still further object of the present invention to provide a process for simply producing a hollow oxide particle whose shell wall is thin in thickness and minutely irregular or porous.

According to a first aspect of the present invention, a hollow oxide particle comprises a shell wall defining a hollow room, and the shell wall has a thickness of 20 nm or less. According to the first aspect of the present invention, the hollow oxide particle is 5–10 times or much larger than the spherical non-hollow particle in a specific surface area. Thus, such particle is to be treated easily and to be applicable to catalytic carriers or the like requiring a large specific surface area. Also, the hollow oxide particle has a small heat-conductivity to be applicable to heat-insulating material, etc.

According to a second aspect of the present invention, a process for producing a hollow oxide particle comprises the steps of: (1) forming a Water in Oil (W/O) type emulsion including a plurality of aqueous microspheres by adding an organic solvent to an aqueous solution dissolving and/or suspending at least one of metal salts and metal compounds; and (2) forming a hollow oxide particle having a shell wall by atomizing and burning the Water in Oil (W/O) type emulsion.

According to a third aspect of the present invention, a process for producing a hollow oxide particle comprises the steps of: (1) forming a Water in Oil (W/O) type emulsion including a plurality of aqueous microspheres by adding an organic solvent to an aqueous solution dissolving and/or suspending at least one of metal salts and metal compounds; (2) forming a hollow oxide particle having a shell wall by atomizing and burning the Water in Oil (W/O) type emulsion; and (3) bringing the hollow oxide particle into contact with an aqueous solution for finely roughening a surface of the shell wall. The step for bringing the hollow oxide powder into contact with the solution is otherwise called a water-treatment herein.

The second aspect and the third aspect of the present invention exhibit an emulsion-combustion process, a short time process, which instantaneously carries out the heating of the aqueous microsphere containing the metal salts, evaporation of the water, and oxidation of the metal salts.

In other words, it is assumed that the hollow oxide particle is synthesized by way of: (1) evaporation of water at the surface of the aqueous microsphere; (2) shrinkage of the aqueous microsphere and nucleation of crystalline at the surface of the aqueous microsphere; and (3) growth and sintering of the nucleated crystallines.

The step for forming the particle in the second aspect and the third aspect is to atomize and to burn the Water in Oil (W/O) type emulsion in order to form the hollow oxide particle. When the Water in Oil (W/O) type emulsion is atomized into a heated reactor, the atomized aqueous microsphere including metal salts or metal compounds is covered with the organic solvent. Thus, the organic solvent is burned to oxidize the metal salts and to evaporate water, so that oxide is formed in a shell-shape to produce the hollow oxide particle.

According to the second aspect and the third aspect of the present invention, each microsphere, ranging from 100 nm to 10 $\mu$m in diameter in the Water in Oil (W/O) type emulsion, constitutes each reaction site, so that a scatter is suppressed in temperature-distribution, and the oxide particle is more homogeneous.

The second aspect and the third aspect of the present invention can easily produce the hollow oxide particle whose shell wall is homogeneous and 20 nm or less in thickness. Since the hollow oxide particle produced in the second aspect and the third aspect has a large specific surface area, the particle is 5–10 times or much larger than a non-hollow particle in specific surface area. Accordingly, the diameter of the hollow particle is larger than that of the non-hollow particle, when both specific areas are same; so, the hollow particle is to be treated easily. Since the second aspect and the third aspect do not require a drying, a calcining, and a milling, these aspects realize a simple step and inexpensive cost as compared with the conventional precipitation method.

The third aspect of the present invention comprises the steps of: composing the Water in Oil (W/O) type emulsion by adding the organic solvent to the aqueous solution dissolving and/or suspending at least one of the metal salts and metal compounds; and forming the hollow oxide particle by atomizing and burning the Water in Oil (W/O) type emulsion. Such aspect can obtain the oxide particle which is not perfectly oxidized by selecting of atomizing conditions and burning conditions. These oxide powder particle synthesized in such a way is brought into contact with water-containing solution—the water treatment. This water treatment cuts bondings of hydroxides and/or bondings of the metal salts, so that the surface of the particle is minutely-irregular or porous and then its specific surface is considerably increased. A change of burning conditions and the types of the solutions can control the specific surface area of the particle.

According to the third aspect of the present invention, the water-treatment, the step for bringing the particle into contact with the solution containing water, generates structural changes at the surface of the particle. Thus, non-hollow particle has a small effect caused by the water-treatment. On the other hand, the hollow particle has a large effect caused by the water-treatment since its surface area is considerably large with respect to its volume.

DETAILED DESCRIPTION OF THE PREFERRED EMBODIMENTS

Figure 1:
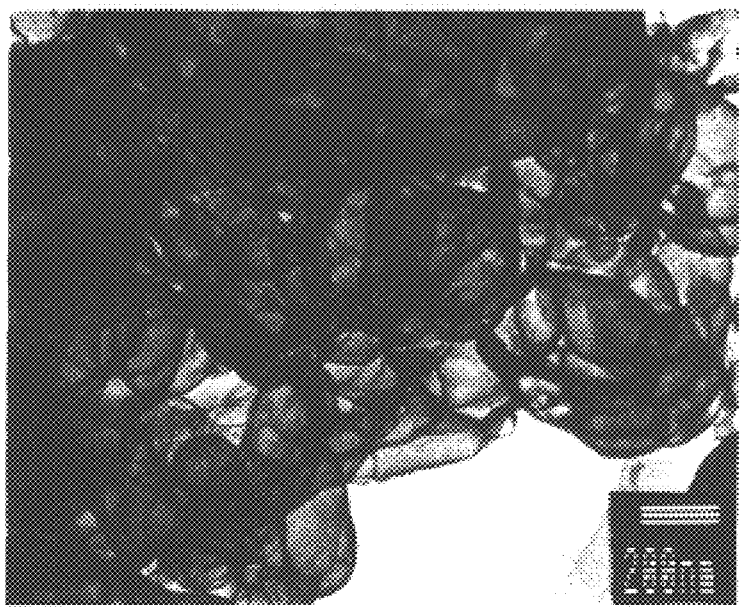
FIG. 1 is a Transmission Electron Microscopy (TEM) photograph exhibiting an alumina particle synthesized in Example 1 at a low magnification.

According to the first aspect of the present invention, a hollow oxide particle is prefererably 50 nm–5 $\mu$m in average diameter, and it may have an approximately spherical shape. The shell wall constituting a hollow room of the hollow oxide particle comprises at least one selected from the group consisting of alumina, spinel, iron oxides, yttrium oxides, and titanium oxides. The shell wall may be simple oxide or complex oxide. For example, the hollow oxide particle, having a shell wall whose thickness is 20 nm or less, is preferably made from a hollow aluminum oxide, or a complex oxide of aluminum. The shell wall may have a finely roughened structure or a porous structure.

The second aspect of the present invention comprises the steps of forming a Water in Oil (W/O) type emulsion whose each of aqueous microspheres is 100 nm or more by adding an organic solvent to an aqueous solution dissolving and/or suspending at least one of metal salts and metal compounds; and forming a hollow oxide particle by atomizing and burning the Water in Oil (W/O) type emulsion so as to form a hollow oxide particle. The emulsion-forming step is to compose a Water in Oil (W/O) emulsion including an organic solvent as a matrix, by mixing of the organic solvent and the aqueous solution in which metal ions or metal compounds are dissolved or suspended. For keeping the aqueous microsphere of the Water in Oil (W/O) emulsion 100 nm or more in diameter, it is preferable to adjust the diameter of the aqueous microsphere by use of surfactants on occasion. The diameter of the aqueous microsphere in the emulsion including at least one of metal salts and metal compounds, is kept stable at the atomizing and burning step, so that reaction site can be controlled during the synthesis. A diameter of the aqueous microsphere in the Water in Oil (W/O) emulsion implies a diameter of an aqueous phase dispersed in the organic solvent of the emulsion.

According to the second and third aspects of the present invention, a diameter of the aqueous microsphere in the emulsion is preferably 100 nm–10 μm. The metal salt is not limited in its type; it may be water-soluble metal salts, such as metal nitrate, metal acetate, metal sulphate, and metal chloride. The aqueous solution containing the metal salt is not limited in concentration of the metal salt.

When the metal salt is used in a suspended state, the size of the metal salt is preferably 1 μm or less, more preferably 0.1 μm or less. The organic solvent preferably is a material capable of composing a Water in Oil (W/O) type emulsion and not dissolved into water. The organic solvent is not limited in its type; it is preferably organic solvents having hydrocarbon groups, such as hexane, octane, kerosine, and gasoline.

According to the second and the third aspects of the present invention, for keeping the Water in Oil (W/O) type emulsion stable, as above-mentioned, it is preferable that a surfactant is added to the emulsion. The surfactant is not limited in its type and its amount. It can be used as follows: cationic surfactants, anionic surfactants, and nonionic surfactants. Its type and its amount may be selected depending upon the type of organic solvent and diameter of the aqueous microsphere.

According to the second and third aspects of the present invention, a mix ratio is not limited in an aqueous component and an organic solvent component composing the emulsion. When a rate of water is more than 70% in the emulsion, a phase inversion is sometimes caused between a dispersed phase and dispersion medium. So, the rate of water is preferably 70% or less for stabilizing the Water in Oil (W/O) type emulsion. A diameter of the aqueous microsphere is controlled by selecting the types and the amount of surfactants. So, the diameter of microsphere is not limited in the emulsion; the diameter of the aqueous microsphere in the emulsion is preferably 100 nm or more for synthesizing hollow particles. When the diameter of the aqueous microsphere is more than 10 μm, reaction sites are so large that a temperature distribution is easily generated and that a burning reaction is unstable in burning emulsion. Therefore, the diameter of the aqueous microsphere in the emulsion is preferably 10 μm or less.

According to the second and third aspects of the present invention, burning temperature is not limited; it is preferably 600–1,000° C. When the burning temperature is 600° C. or less, the organic solvent is hard to completely burn. When the burning temperature exceeds 1,000° C., the synthesized particles may be aggregated, further in the third aspect of the present invention, the metal salt may completely be oxidized to cause a problem that effect of water-treatment disappears. Burning atmosphere is not limited. Insufficiency of oxygen causes a problem that carbon contained in the organic solvent sometimes remains because of incomplete combustion. Thus, it is preferable to supply oxygen, for burning the organic solvent of the emulsion completely.

According to the third aspect of the present invention, it is preferable to control oxidation reactions of the metal salts and metal compounds. Change of burning temperature of the emulsion can control the oxidation reaction. On the other hand, even when burning temperature can not be changed because of powder composition, particle shape and the like, the oxidation reaction can be controlled by heat-treatment after the combustion of emulsion. In such a case, the heat-treatment is not limited in its temperature, its time, and its atmosphere.

The size of the aqueous microsphere in the emulsion is preferably 100 nm or more in order to make the particle hollow. When the microsphere in the emulsion is less than 100 nm, the microsphere completely shrinks before the shell wall is formed at the surface of the microsphere, so that the oxide does not constitute a hollow particle but a non-hollow particle. When the microsphere in the emulsion exceeds 10 μm, the reaction site is so large that oxidation reaction requires a long time, and the product may disadvantageously be heterogeneous in its composition.

When the oxide is made from alumina or complex oxide whose main component is aluminum, the process of the present invention may provide a hollow oxide particle having an extremely thin shell wall. Such reason is not clear at the present time, but it is assumed that an aluminum ion tends to be precipitated, oxidized and coalesced to form the shell wall of the hollow oxide particle in this condition.

According to the third aspect, the solution for water-treatment is not limited in its type, except including water. Such solution may be at least one of water, deionized water, acid solutions, alkaline solutions, and mixed solutions mixing alcohol with water. Such solution may be water; acid solutions such as nitric acids and hydrochloric acids; and alkaline solutions such ammonia solutions and sodium hydroxide solutions. Also, the solution for water-treatment may be a solution mixing the aforesaid solution and water-soluble organic solvent such as ethanol. The third aspect of the present invention is not limited in temperature and time for the water-treatment. Changing solution-types, temperature and time of the water-treatment can control a surface structure of the oxide particle. The third aspect of the present invention is not limited in a manner for bringing the particle brought into contact with an aqueous solution. For example, the synthesized oxide particle may be mixed with the aqueous solution, or, may be brought into contact with atomized aqueous solutions.

When oxidation is sufficiently proceeded, nucleated crysallines of the oxide generated at the surface of the aqueous microsphere grow to have a diameter of tens nm or less, and the nucleated crysallines of the oxide are sintered to form one oxide particle. On the other hand, when oxidation is insufficiently proceeded, each of nucleated crysallines is insufficiently oxidized and insufficiently sintered; so, it is thought that hydroxide and metal salts sometimes remain partially at the surface of the nucleated crysallines. In such a case, it is assumed that the water cuts the bondings linked with the residual hydroxides and metal salts to make the surface of the particles minutely irregular or porous.

EXAMPLE

Examples will concretely be described hereinafter.

Example 1

(Emulsion-Composing Step)

There was used an emulsion including an aqueous phase and an oil phase. The aqueous phase was formed with an aluminum nitrate aqueous solution in which commercial aluminum nitrate ($Al(NO_3)_3 \cdot 9H_2O$) was dissolved in deionized water at a concentration of 0.1–2 mole/liter. An organic solvent was commercial kerosine. SUN SOFT No. 818H (TAIYOU KAGAKU Co., Ltd.) was used at 5–10 wt. % with respect to the kerosine as a surfactant. The kerosine including such surfactant was used as the oil phase in the emulsion.

The aqueous phase and the oil phase were mixed so that a ratio of aqueous phase/oil phase might be (40–70)/(60–30) by volume %. This mixed solution was stirred by use of a homogenizer at 1,000–20,000 rpm for 5–30 minutes to compose a Water in Oil (W/O) emulsion. According to observations using an optical microscope, each aqueous microsphere was approximately 1–2 μm in diameter in the emulsion concerning Example 1.

(Powder-Producing Step)

Figure 2:
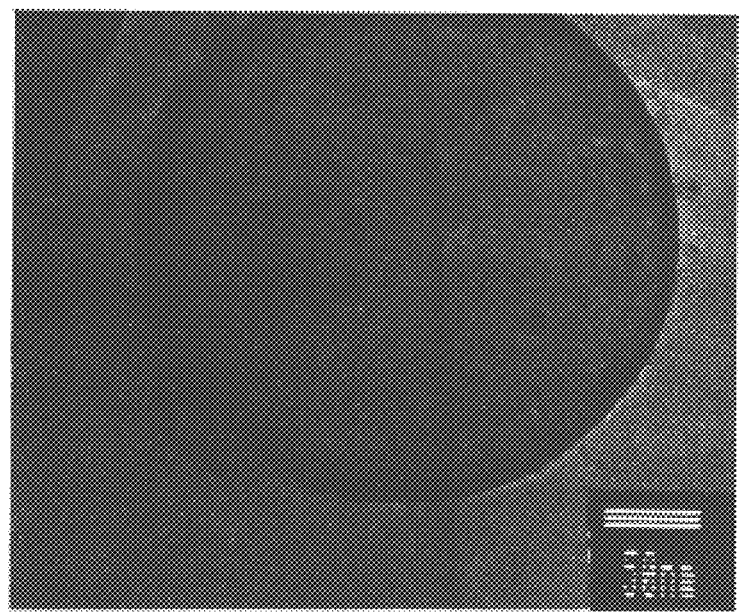
FIG. 2 is a TEM photograph exhibiting an alumina particle synthesized in Example 1 at a high magnification.

The composed Water in Oil (W/O) emulsion was atomized by use of a emulsion-burning apparatus, developed by the present inventor and disclosed in Japanese Unexamined Publication Patent 7-81,905, so that the oil phase of the emulsion was burned and metal ion existing in the aqueous phase was oxidized to synthesize oxide particles. As for conditions for synthesizing the oxide particles, the emulsion-burning apparatus controlled an atomizing flow rate of the emulsion, a flow rate of air, and the like in such a manner that the atomized emulsion was completely burned and a temperature of flame was constant in the range of 700–1,000° C. The produced particles were collected by a bag filter disposed at the rear side of a reaction tube of the apparatus The produced oxide particle concerning Example 1 was observed by use of a transmission electron microscopy (TEM). FIG. 1 shows a TEM picture photographed at a low magnification. According to FIG. 1, the particle was a hollow particle whose shell wall was extremely thin since the back side thereof was clearly observed. FIG. 2 shows another TEM picture photographed at a high magnification with respect to the particle concerning Example 1. According to FIG. 2, a thickness of the shell wall of the powder particle was approximately 10 nm.

Example 2

This example is to produce hollow spinel particles.

In this example, weight was measured with respect to commercial aluminum nitrate ($Al(NO_3)_3 \cdot 9H_2O$), and magnesium nitrate ($Mg(NO_3)_2 \cdot 6H_2O$) in such a manner that a ratio of Al/Mg (mole ratio) is 2/1. They were dissolved in deionized water to obtain a solution mixing aluminum nitrate and magnesium nitrate at a concentration of 0.1–2 mole/liter so as to constitute an aqueous phase. The conditions in this example were the same as those of Example 1 in an oil phase, an emulsion-producing step, and a powder-producing step.

Figure 3:
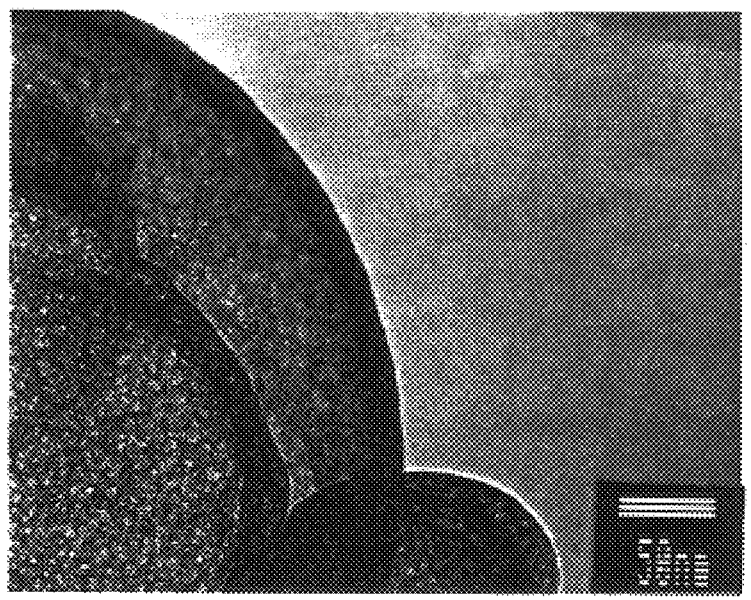
FIG. 3 is a TEM photograph exhibiting a spinel particle synthesized in Example 2.

FIG. 3 shows a TEM picture, showing the produced oxide particles, concerning Example 2, photographed at a high magnification. According to FIG. 3, the oxide powder particle was a hollow particle whose shell wall is extremely thin—a thickness of the shell wall of the particle exhibiting a little less than 20 nm.

Example 3

This example is to produce other types of oxide particles. An aqueous phase of an emulsion was formed with a metal aqueous solution in which commercial magnesium nitrate ($Mg(NO_3)_2 \cdot 6H_2O$) was dissolved in deionized water at a concentration of 0.1–2 mole/liter. Another aqueous phase of another emulsion was formed with a metal aqueous solution in which commercial iron nitrate ($Fe(NO_3)_3 \cdot 9H_2O$) was dissolved in deionized water at a concentration of 0.1–2 mole/liter. Another aqueous phase of the still another emulsion was formed with a metal aqueous solution in which yttrium nitrate ($Y(NO_3)_3 \cdot 6H_2O$) was dissolved in deionized water at a concentration of 0.1–2 mole/liter. The other aqueous phase of the other emulsion was formed with a metal aqueous solution in which commercial titanium tetrachloride ($TiCl_4$) was diluted with deionized water at a concentration of 0.1–2 mole/liter.

The conditions in this example were the same as those of Example 1 in an oil phase for constituting the emulsion, an emulsion-producing step, and a powder-producing step.

The present inventor confirmed that such examples provided hollow particles made from magnesium oxide, hollow particles made from iron oxide, hollow particles made from yttrium oxide, and hollow particle titanium oxides, respectively. They confirmed that these particles had a shell wall thickness of 20 nm or less.

Example 4

The emulsion concerning Example 4 was composed with the aqueous phase formed in Example 1, the oil phase formed in Example 1, and NP6 (polyoxyethylene-6-nonyl-phenyl-ether) as a surfactant. A mole ratio of water/NP6 was adjusted between 10 and 100; so, a emulsion was composed including aqueous microspheres having a each diameter of 100–400 nm.

A powder-producing step was carried out on the same conditions as those of Example 1. In the same way as Example 1, the present inventor confirmed that this example provided hollow alumina particles in which each particle had a shell wall thickness of 20 nm or less. Therefore, when the aqueous microsphere of the emulsion was 100 nm or more in diameter, one aqueous microsphere resulted in one hollow oxide particle.

Comparative Example

This comparative example is to alumina particle by way of a step in which the an aqueous microsphere is below 100 nm in diameter. The surfactant was NP6 (polyoxyethylene-6-nonyl-phenyl-ether). A mole ratio of water/NP6 was adjusted between 10 and 100; so, an emulsion was composed including an aqueous microsphere having a diameter of 30–80 nm. A powder-producing step was carried out on the same conditions as those of Example 1. This comparative example, unlike Examples 1–4, was not able to produce hollow particles.

Examples 5 and 6

There was used an aqueous phase and an oil phase composing an emulsion concerning Examples 5,6. The aqueous phase was formed with an aluminum nitrate aqueous solution in which commercial aluminum nitrate was dissolved in deionized water at a concentration of 0.1–2 mole/liter. An organic solvent was commercial kerosine. SUN SOFT No. 818H (TAIYOU KAGAKU Co., Ltd.) was used at 5–10 wt. % So with respect to the kerosine as a surfactant. The kerosine including such surfactant constituted the oil phase in the emulsion. The aqueous phase and the oil phase were mixed so that a ratio of aqueous phase /oil phase was (50–70)/(50–30) by volume %. This mixed solution was stirred by use of the homogenizer at 1,000–20,000 rpm for 5–30 minutes to form a Water in Oil (W/O) emulsion. According to observations of the optical microscope, the aqueous microsphere of the emulsion was approximately 1–2 μm in diameter.

The aforesaid Water in Oil (W/O) emulsion was atomized and burned by use of a emulsion-burning apparatus to synthesize the oxide powders. As for conditions for synthesizing the oxide powders, the emulsion-burning apparatus controlled a flow rate of the emulsion, a flow rate of air (oxygen), and the like in such a manner that the atomized emulsion was completely burned and temperature of flame was constant in the range of 600–800° C. The produced particles were collected by use of the bag filter disposed at the rear side of the reaction tube of the apparatus. The produced oxide powder particles were observed by use of the transmission electron microscope (TEM). According to the TEM observation, the alumina powder particle was a hollow particle whose shell wall was 10–20 nm in thickness. This particles displayed Example 5.

The synthesized oxide particles (1–10 g) concerning Example 5 were mixed deionized water (10–1000 cc) to form a suspension. This suspension was stirred by use of a magnetic stirrer at room temperature for 1–240 minutes. Thereafter, the suspension was filtrated, and then the filtrated product was washed with deionized water several times. The product was dried, crushed. After that, the crushed powder product was estimated in observation of shape (SEM) and in measurement of the specific surface area (BET).

Figure 4:
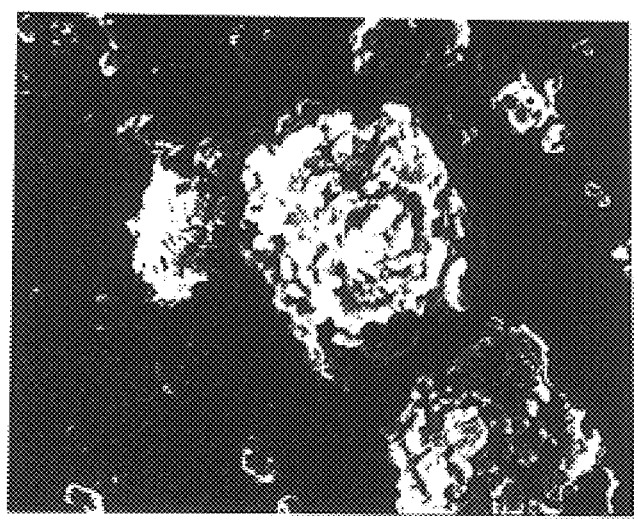
FIG. 4 is a Scanning Electron Microscopy (SEM) photograph exhibiting a surface structure of a porous oxide particle concerning Example 6 carrying out a water-treatment.

In Example 6, a water-treatment was carried out with respect to the oxide particles produced in Example 5. The SEM photograph exhibited in FIG. 4 shows a surface structure of the oxide particles after the water-treatment in Example 6, whereas the SEM photograph exhibited in FIG. 5 shows a surface structure of the oxide particles before the water-treatment in Example 5.

Figure 5:
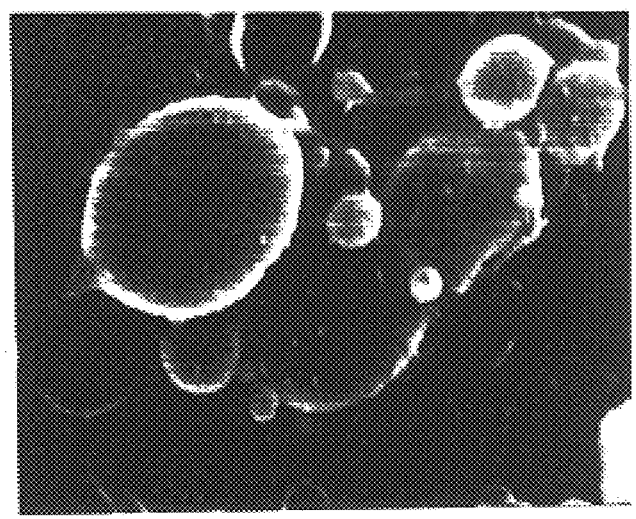
FIG. 5 is a SEM photograph exhibiting a surface structure of an oxide particle concerning Example 5 not carrying out a water-treatment.

FIG. 5 shows that the surface of the particle before the water-treatment was extremely smooth. As a result of measurement, the specific surface area before the water-treatment was 46 $m^2/g$. This measured result approximately corresponded to a specific surface area calculated from an amount of aluminium ion, a diameter of synthesized particle, thickness of shell wall, and its density, provided that the shell wall is smooth and nitrogen is absorbed at the inner surface and the outer surface of the shell wall. Thus, it was also thought that the surface of the particle was smooth, judging from correspondence of both specific surface areas. Meanwhile, according to the oxide particle after the water-treatment concerning Example 6, as shown in FIG. 4, it was found that a surface structure was collapsed to exhibit an irregular structure having the order of tens nm.

Examples 7–9

In Example 7, the oxide particles produced in Example 5 was water-treated and its specific surface area was measured in the same method as Example 6, except that nitric acid having a concentration of 1 mol/liter was used instead of the deionized water in a water-treatment.

In Example 8, the oxide particles produced in Example 5 was water-treated and then its specific surface area was measured in the same method as Example 6, except that an aqueous ammonia solution having a concentration of 1 mol/liter was used instead of the deionized water in a water-treatment.

In Example 9, the oxide powder particles produced in Example 5 was water-treated and then its specific surface area was measured in the same method as Example 6, except that a mixed solution of deionized water and ethanol, having a volume ratio of 1:1, was used instead of the deionized water in a water-treatment.

Examples 10–13

These examples changed the aqueous phase of the emulsion which is the mixed aqueous solution of aluminum nitrate and sodium nitrate at a Na/Al mole ratio of 1/99 and which have a concentration of 0.1–2 mol/liter, instead of the aluminum nitrate having a concentration of 0.1–2 mole/liter. These examples produced alumina powder particles containing Na (sodium) in the same way as Example 5. Such particles was hollow and their shell wall were extremely thin like Example 5.

In Example 10, one group particles of such particles did not experience a water-treatment, and was measured about a specific surface area.

In Examples 11–13, another group particles of such particles experienced a water-treatment in the following methods, and they were measured about a specific surface area. The oxide particles concerning Example 11 was water-treated with deionized water like Example 6. The oxide particles concerning Example 12 were water-treated with a nitric acid solution having a concentration of 1 mol/liter like Example 7. The oxide particles concerning Example 13 were water-treated with an aqueous ammonia solution having a concentration of 1 mol/liter like Example 8.

Examples 14–17

These examples changed the aqueous phase which is the mixed solution of aluminum nitrate and magnesium nitrate at a Mg/Al mole ratio of 1/99 and which have a concentration of 0.1–2 mol/liter, instead of the aluminum nitrate having a concentration of 0.1–2 mole/liter. These examples produced alumina particle containing Mg (magnesium) in the same way as Example 5. Such particles were hollow and their shell walls were extremely thin like Example 5.

In Example 14, one group particles of such particles did not experience a water-treatment, and was measured about a specific surface area.

In Examples 15–17, another group particles of such particles experienced a water-treatment in the following methods, and were measured about a specific surface area.

The oxide particles concerning Example 15 were water-treated with deionized water like Example 6. The oxide particles concerning Example 16 were water-treated with a nitric acid solution having a concentration of 1 mol/liter like Example 7. The oxide particle concerning Example 17 was water-treated with an aqueous ammonia solution having a concentration of 1 mol/liter like Example 8. Table 1 lists the specific surface area of the aforedescribed oxide particles concerning Examples 5–17.

TABLE 1

| Item | Specific Surface Area, $m^2/g$ |
| --- | --- |
| Example 5 | 46 |
| Example 6 | 201 |
| Example 7 | 185 |
| Example 8 | 212 |
| Example 9 | 80 |
| Example 10 | 45 |
| Example 11 | 253 |
| Example 12 | 193 |
| Example 13 | 230 |
| Example 14 | 50 |
| Example 15 | 148 |
| Example 16 | 130 |
| Example 17 | 162 |

As appreciated in Table 1, the specific surface area of particle after water-treatment concerning Examples 6–9, Examples 11–13, and Examples 15–17 are considerably increased as compared with that of the particle before water-treatment concerning Examples 5,10,14. According to SEM observations concerning Examples 6–9, Examples 11–13, and Examples 15–17, with a difference depending upon compositions of the particle and conditions of the water-treatment, a collapse was observed in the surface structure of the particle like Example 6. Example 9, using the mixed solution of water and alcohol, reduced a chance for water to be brought into contact with the particle.

Thus, it was found that collapse was small at the surface structure of the particle and increase of the specific surface was small in Example 9 as compared with the case using only water. This implies that change of water/alcohol ratio controls a surface structure and a specific surface area. According to the results of the above-examples, the specific surface area was as follows:

particles treated with ammonia-solution>particles treated with deionized water>particles treated with nitric acid solution This implies that a pH value of the solution used in the water-treatment can control a specific surface area of particles Examples 18–21

The alumina particles produced in Example 5 were heat-treated by use of an electrical furnace in the range 700–1,000° C. for 4 hours. The heat-treated particles were water-treated with deionized water, and their specific surface areas were measured Table 2 lists the measured specific surface areas. As for temperature of the heat-treatment, Example 18 was carried out at 700° C., Example 19 was carried out at 800° C., Example 20 was carried out at 900° C., and Example 21 was carried out at 1,000° C.

TABLE 2

| Item | Specific Surface Area, $m^2/g$ |
| --- | --- |
| Example 18 | 198 |
| Example 19 | 185 |
| Example 20 | 158 |
| Example 21 | 109 |

As appreciated from Table 2, it was founded that the particles after heat-treatment increased their specific surface area. Also, it was founded that the particles after heat-treatment decreased their specific surface area with increasing temperature in the heat-treatment.

According to SEM observations with respect to the particles concerning Examples 18–21, with difference depending upon conditions of heat-treatment, a collapse was observed at the surface structure of the particle like Example 6. The higher the temperature of heat-treatment, the smaller the collapse at the surface structure. Namely, it was confirmed that the surface structure of the particles tended to approach a state displayed in FIG. 5 exhibiting Example 5. This may be based on the reason why oxidation is partially proceeded by heat-treatment to decrease hydroxide and undecomposed metal salts remaining at the surface of the crystallines., so that collapse is suppressed at the surface structure. This implies that heat-treatment carried out after synthesizing the oxide particle can control a surface structure and a specific surface area between water-treated state and not water-treated state.

What is claimed is:

1. A hollow oxide particle comprising:

a shell wall defining a hollow room, said shell wall formed of alumina or a complex oxide of aluminum, and having a thickness of 20 nm or less, wherein said hollow oxide particle is in the range from 50 nm to 5 $\mu$m in average diameter.

2. The hollow oxide particle according to claim 1, wherein said hollow oxide particle has an approximately spherical shape.

3. The hollow oxide particle according to claim 1, wherein said shell wall has a fine roughness.

4. The hollow oxide particle according to claim 1, wherein said shell wall is porous.

5. A process for producing a hollow oxide particle, comprising the steps of:

forming a water in oil emulsion including a plurality of aqueous microspheres by adding an organic solvent to an aqueous solution containing at least one of aluminum-containing salts and aluminum-containing compounds dissolved and/or suspended therein; and forming a hollow oxide particle having a shell wall by atomizing and burning said water in oil emulsion, said shell wall formed of alumina or a complex oxide of aluminum from said aluminum-containing salts and/or compounds, and said shell wall having a thickness of 20 nm or less, wherein said hollow oxide particle is in the range from 50 nm to 5 $\mu$m in average diameter.

6. The process according to claim 5, wherein said aqueous microsphere of said water in oil emulsion in said emulsion-forming step is in the range of from 100 nm to 10 $\mu$m in diameter.

7. The process according to claim 5, wherein said burning is at a temperature in the range from 600° C. to 1,000° C.

8. A process for producing a hollow oxide particle, comprising the steps of:

forming a water in oil emulsion including a plurality of aqueous microspheres by adding an organic solvent to an aqueous solution containing at least one of aluminum-containing salts and aluminum-containing compounds dissolved and/or suspended therein; and forming a hollow oxide particle having a shell wall by atomizing and burning said water in oil emulsion; and bringing said hollow oxide particle into contact with an aqueous solution for finely roughening a surface of said shell wall, said shell wall formed of alumina or a complex oxide of aluminum from said aluminum-containing salts and/or compounds, and said shell wall having a thickness of 20 nm or less, wherein said hollow oxide particle is in the range from 50 nm to 5 $\mu$m in average diameter.

9. The process according to claim 8, wherein said aqueous microsphere of said water in oil emulsion in said emulsion-forming step is in the range of from 100 nm to 10 $\mu$m in diameter.

10. The process according to claim 8, wherein said aqueous solution is at least one selected from the group consisting of water, deionized water, acid aqueous solutions, alkaline aqueous solutions, and mixed solutions of alcohol and water.

* * * * *